Nov. 11, 1969 F. W. BRILL ET AL 3,477,835
METHOD OF CLEANING STEM LEADS FOR ELECTRON DEVICES
Filed Dec. 19, 1966
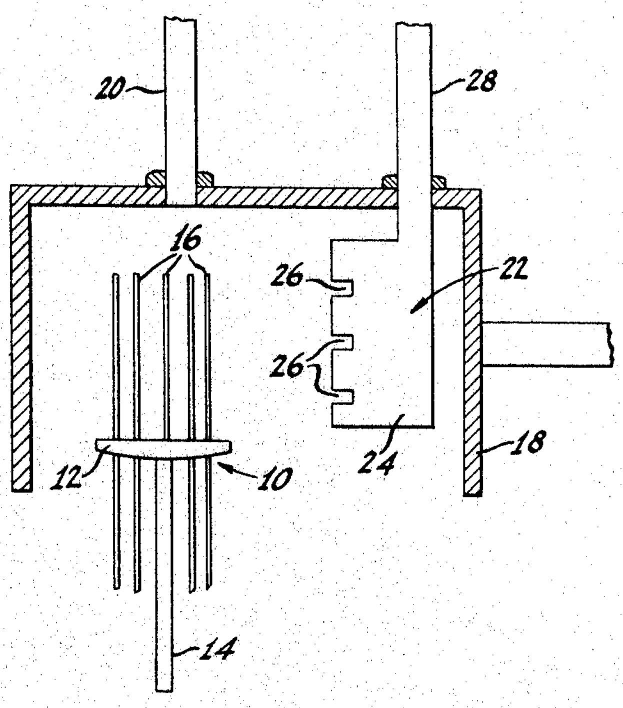
Inventors:
FREDERICK W. BRILL &
MORRIS R. WEINGARTEN
By M. Y. Epstein
Attorney 3,477,835

METHOD OF CLEANING STEM LEADS FOR ELECTRON DEVICES

Frederick W. Brill and Morris R. Weingarten, Lancaster, Pa., assignors to RCA Corporation, a corporation of Delaware Filed Dec. 19, 1966, Ser. No. 602,668
Int. Cl. C03c *27/02*
U.S. Cl. 65—32 3 Claims

ABSTRACT OF THE DISCLOSURE

In the manufacture of stems for electron tubes, after the stem has been made by subjecting a mass of glass to successive operations in air for heating and forming a glass header around a plurality of metal leads, such as nickel, in which operations the leads become oxidized, the stem is inserted in a housing containing an atmosphere of a reducing gas, and oxygen is admitted to the housing to produce a reducing flame which very rapidly heats the leads and causes reduction of the oxides, without causing damage to the glass header. The amount of said reducing gas in the housing sufficiently exceeds the amount thereof required to consume all of the oxygen therein.

This invention relates to the manufacture of stems for electron devices, and particularly to the mass production of glass stems for use in electron tubes, semiconductor devices, or the like.

Various types of stems comprising a header member and a plurality of leads sealed therethrough are fabricated extremely rapidly and at low cost on automatic stem-making apparatus. In such apparatus, the leads and a glass form are mounted on a chuck, and the chuck is indexed through a plurality of operating stations where the glass form is heated to a semimolten state and pressed and fused around the leads.

A problem that has long existed with the use of such apparatus is that during the heating and fusing operations, which are performed in air, the leads become oxidized. The standard method of cleaning or reconverting the oxide to the metallic state comprises heating the leads to a temperature higher than the leads were heated during the stem forming operations, and to insert the heated leads into a cleaning or reducing atmosphere such as hydrogen. The reducing atmosphere reduces the oxide on the leads. The leads are thereafter cooled within the reducing atmosphere.

A difficulty with the prior art cleaning method is that the process of heating the stem leads to a temperature high enough to cause the reducing gas to react with and deoxidize the leads causes an additional heavy and deep build-up of oxides on the leads. This heavy and deep oxide, it is found, is all but impossible to completely convert to the original metal.

While it is known to employ apparatus for heating oxidized metals while in a reducing atmosphere to obtain reduction of oxides, such as, for example, the use of an oven for heating the reducing atmosphere housing, such apparatus does not lend itself to use with the high speed, automatic stem-forming apparatus of the present day. Additionally, re-heating of the stems in an oven is undesirable since it involves heating the glass header to an excessively high temperature, which can result in destruction of the metal lead to glass seals as well as deformation of the glass header.

An object of this invention is to provide an improved method of removing oxides from electron device stem leads.

A further object of this invention is to provide a novel method of heating the leads of a stem on an automatic stem-fabricating apparatus to provide rapid and localized heating of the stem leads within a reducing atmosphere for removing oxides from the leads while avoiding excessive heating of the header of the stem.

For achieving these objects in a process using an automatic stem-fabricating apparatus of the type described, a stem, after it has been formed by known heating and glass pressing operations, is inserted into a housing containing a reducing gas atmosphere. While in the housing, the leads are locally and rapidly heated by a reducing flame obtained by introducing a jet of oxygen into the housing. The reducing flame is then extinguished, and the leads are thereafter cooled by the reducing atmosphere before the stem leads are removed from the housing. The reducing gas atmosphere may be any gas that consists essentially of hydrogen as the active reducing agent, such as hydrogen gas, or dissociated ammonia which is a mixture of hydrogen gas and inert nitrogen gas.

The drawing is a side elevation, partly in section, of apparatus for performing the method of the present invention.

Apparatus of the type with which the present invention has utility are known. See for example U.S. Patents 3,201,216, to Handmann, issued Aug. 17, 1965, and 3,210,822 to Lenz et al., issued Oct. 12, 1965. In general, the invention has particular utility in apparatus of the type in which a stem workpiece is successively indexed to successive operating stations and wherein heating of the workpiece in air occurs.

With reference to the drawing, a stem 10 comprising a glass header 12, an exhaust tubulation 14, and a plurality of leads 16 sealed through the header 12 is shown inserted with an inverted cup-shaped housing 18. Although not shown, the stem 10, in the usual apparatus, is mounted on a chuck which is rotatable about the axis of the tubulation 14. The chuck, in turn, is mounted on the periphery of a rotatable turret, and the housing 18 is mounted on the apparatus framework above the path of the chuck. Means, not shown, are provided for moving the housing up and down, whereby upon an indexing of the chuck to a point below the housing 18, the housing can be lowered to a position around the upper portion of the stem 10 as shown in the drawing.

The housing 18 contains a reducing atmosphere such as hydrogen gas or dissociated ammonia, or the like, supplied through a tubing 20. Mounted within the housing 18 is a burner 22 comprising a metal tubing 24 having a plurality of vertically spaced horizontal slots 26 through the wall thereof. The burner 22 is supplied with oxygen through a tubing 28. Valve means, not shown, are provided for regulating the supply of both the oxygen and the hydrogen to the housing through the tubings 28 and 20, respectively.

The stem 10, when it has reached the housing 18 has been fully formed, in known manner. The leads 16, however, have been oxidized in the process, and it remains to clean and deoxidize the portions of the leads on the side of the header 12 opposite the tubulation 14.

To accomplish this, in the illustrative embodiment, the housing 18 is disposed around the upper portion of the stem 10, as shown. At this time, hydrogen is being admitted into the housing 18 to provide the housing with a hydrogen atmosphere. Immediately upon the disposition of the housing around the stem, oxygen is admitted to the burner 22 and emerges through the slots 26 as a series of jets. The oxygen jets ignite in the hydrogen atmosphere and provide intense and high temperature flames which very rapidly heat the leads to a temperature sufficient to cause rapid reconversion of the oxides on the metal leads to the metal. The temperature required depends upon the material of the leads.

Witihn the housing 18, the amount of reducing gas significantly exceeds the amount required to consume all the oxygen, hence the flames are reducing.

To promote uniform heating of the leads the stem is preferably rotated while it is within the housing. Also, the slots 26 in the oxygen burner 22 are so arranged to heat the leads in a manner to compensate for non-uniform cooling of the leads. For example, the slots 26 near the bottom of the burner 22 are wider to provide a hotter flame on the portion of the leads adjacent to the stem header 12.

To prevent fracture of the glass header 12 due to the sudden thermal expansion of the heated leads 16, the temperature of the glass header when the stem is inserted into the housing 18 should be higher than the annealing temperature of the glass. If the header 12 is not this hot when the stem 10 reaches the housing 18 station, a pre-heating step is employed. To avoid oxidizing the leads, the stem is heated no higher than necessary, e.g., in the order of 500° C.

Preferably, as shown, the glass header 12 is so positioned relative to the burner 22 that the flames do not impinge thereon.

After the leads have been heated, the oxygen flow is stopped to extinguish the flames and to allow cooling of the leads in the reducing atmosphere. Preferably, the flow of reducing gas to the housing through the tubing 20 is continuous whereby the leads are quickly cooled by the gas flow. The leads are cooled before the housing 18 is removed to a temperature low enough so that the leads are not re-oxidized when they are again exposed to air.

In the illustrative embodiment the hydrogen burns continuously at the mouth or bottom of the housing 18. To prevent reoxidation of the leads when the housing 18 is removed, the indexing movements of the housing and stem are arranged to pass the leads rapidly through the burning hydrogen gas. Also, to reduce the size of this flame, the rate of hydrogen flow is reduced at this time.

The continuously burning hydrogen flame serves to ignite the oxygen within the housing 18 when the oxygen is admitted to the burner 22.

An advantage of the use of an oxygen jet is that a high temperature heat source is thus provided which can be directed onto the leads for rapidly and locally heating the leads only. That is, the flame produced is so intense that the leads can be quickly heated to the desired temperature with relatively little heating of the header 12 by conduction of heat through the leads. For example, in one embodiment, in which a glass header-nickel lead stem is to be made, an apparatus is used which provides an operating time between indices of 8 seconds. After the housing 18 is lowered around the stem 10, the oxygen is admitted to the burner 22 for a period of between 1.2 and 2.5 seconds. During this short time, the leads are heated to a temperature sufficiently high to cause reconversion of the lead oxides. The temperature of the header, 12 however, is not increased to a temperature at which damage to the header or to the lead to glass seals within the header occurs. The remaining period of time of the stem 10 in the housing 18, in the order of 4.5 to 5.8 seconds, is sufficient to cool the leads to a temperature at which reoxidation of the leads, when the leads are exposed to air, does not occur.

In comparison with stems made according to prior art methods, the stems made as herein described have been found far cleaner and far freer of oxides and thus better suited to welding. That is, the stems made according to the prior art were prone to cause weak welds and excessive weld splash due to the presence of oxide layers either on the surface of the leads or slightly below the surfaces of the leads. Such weld defects, as known, cause significant loss of production of devices incorporating the stems. The use of stems made according to the present invention has significantly reduced the loss of production caused by such defective welds.

What is claimed is:

1. In a method of fabricating stems for electron devices wherein a stem is made by subjecting glass to successive operations for heating and forming a glass header around a plurality of metal leads, said operations being performed in air whereby oxidation of the leads occurs, the improvement comprising:

inserting said stem having oxidized leads into a housing containing a reducing atmosphere of a gas that consists essentially of hydrogen as the active reducing agent, admitting oxygen into said housing to provide a reducing flame for heating said leads and for removing oxides from said leads, the amount of said reducing gas in said housing significantly exceeding the amount required to consume all of the oxygen therein, directing a jet of said oxygen onto said leads for a short time to heat said leads very rapidly to a temperature sufficient to cause reduction of the oxides on the exposed portions of said leads by said reducing atmosphere, without heating said glass header to a temperature sufficient to cause damage thereto, stopping the flow of oxygen to extinguish the flame, and retaining said leads within said housing for a time sufficient to cause cooling of said leads to a temperature low enough to prevent reoxidation thereof upon removal from said housing.

2. The method of claim 1, wherein said stem is preheated, before insertion into said housing, to a temperature higher than the annealing temperature of said glass header.

3. The method of claim 1, wherein said metal leads are of nickel, said reducing gas is hydrogen gas, and said leads are heated by said oxygen flame for a period between 1.2 and 2.5 seconds.

References Cited

UNITED STATES PATENTS 2,967,113 1/1961 Liebhafsky et al. ------ 65—32
3,203,084 8/1965 Best ---------------- 65—32

S. LEON BASHORE, Primary Examiner

E. R. FREEDMAN, Assistant Examiner

U.S. Cl. X.R.

65—27, 30, 59, 155, 138, 157, 168